(No Model.)
C. F. BRUSH.
SECONDARY BATTERY CHARGING.
No. 395,378. Patented Jan. 1, 1889.
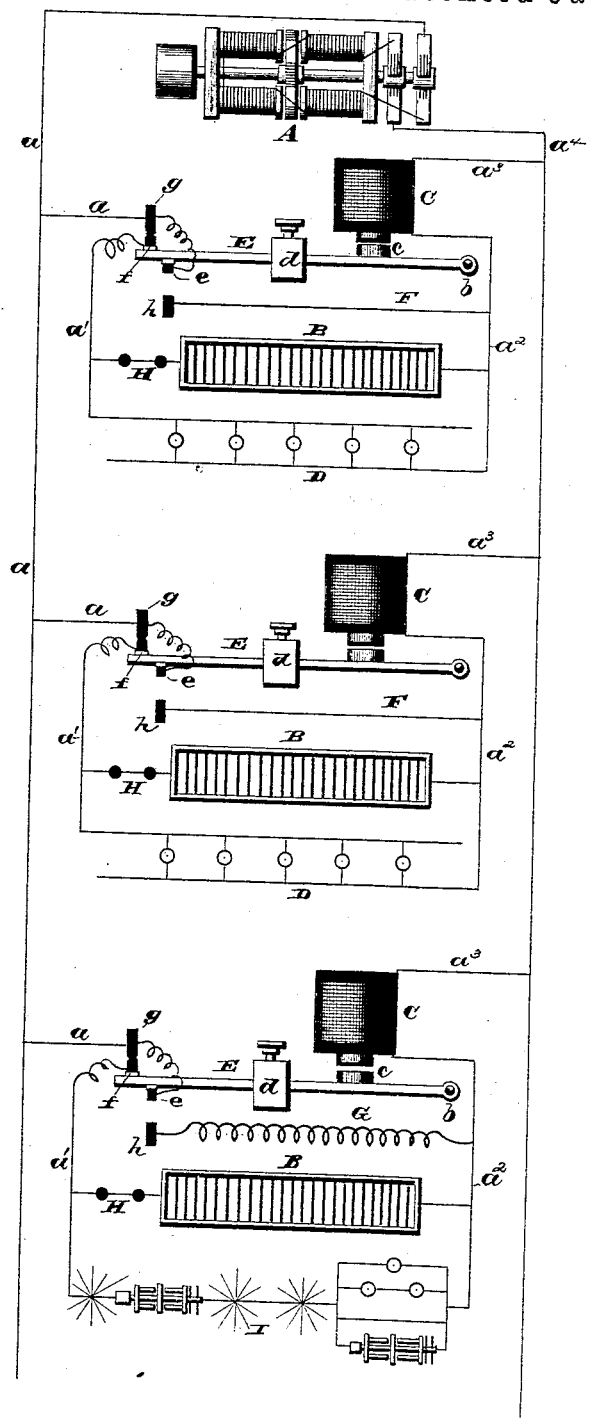
WITNESSES
C. J. Nottingham
G. F. Downing
INVENTOR.
Charles F. Brush,
By Suggett & Suggett
Attorney.

UNITED STATES PATENT OFFICE.

CHARLES F. BRUSH, OF CLEVELAND, OHIO, ASSIGNOR TO THE BRUSH ELECTRIC COMPANY, OF SAME PLACE.

SECONDARY-BATTERY CHARGING.

SPECIFICATION forming part of Letters Patent No. 395,378, dated January 1, 1889.

Original application filed June 13, 1882, Serial No. 64,033. Divided and this application filed December 11, 1883. Serial No. 114,209. (No model.) Patented in England July 1, 1882, No. 3,108; in Belgium July 22, 1882, No. 58,539; in Germany July 25, 1882, No. 24,582; in France July 26, 1882, No. 150,318; in Russia August 5, 1882, No. 5,699; in Italy September 30, 1882, No. 14,453; in Victoria November 13, 1882, No. 3,344; in Cape of Good Hope December 15, 1882, No. 11/121; in South Australia December 20, 1882, No. 318; in Spain February 1, 1883, No. 3,478; in Austria-Hungary April 15, 1883, No. 3,604; in Portugal May 2, 1883, No. 841; in India May 8, 1883, No. 170/82, and in New South Wales June 27, 1883, No. 1,262.

*To all whom it may concern:*

Be it known that I, CHARLES F. BRUSH, of Cleveland, in the county of Cuyahoga and State of Ohio, have invented certain new and useful Improvements in Secondary-Battery Charging; and I do hereby declare the following to be a full, clear, and exact description of the invention, such as will enable others skilled in the art to which it appertains to make and use the same.

My invention relates to the distribution and automatic manipulation of the current employed in charging secondary batteries or apparatus for the storage of electrical energy; and it consists in the combination, with an electric generator, a main or charging circuit, and a secondary battery connected or associated with the main charging-circuit in "multiple arc," of devices actuated and controlled by the current for automatically switching the secondary battery into the charging-circuit.

The invention further consists in the combination, with an electric generator, a main or charging circuit, and a secondary battery connected or associated with the main or charging circuit in multiple arc, of devices actuated and controlled by the current for automatically switching the secondary battery out of the charging-circuit.

The invention further consists in certain other improvements in the arrangement and combinations of parts in a system employing secondary batteries, as will hereinafter be explained, and specified in the claims.

The accompanying drawing illustrates a system embodying my invention in one of its many forms of constructions and relative arrangements of parts.

A represents a current-generator, which may consist of a dynamo or magneto electric machine, thermo-electric, or other apparatus capable of furnishing an electric current.

B represents secondary batteries of any approved type or construction.

C is an electro-magnet located in the circuit $a\ a'\ a^2\ a^3\ a^4$, connecting the generator and secondary battery.

D represent a number of electric lamps, either arc or incandescent, or other translating devices, such as motors or other devices.

E represent levers, each being pivoted at $b$ and provided with an armature, $c$, facing the pole or poles of the magnet C. The lever E may be provided with an adjustable weight, $d$. The free end of the lever carries contact-points $e\ f$, which are insulated from each other.

To the charging-circuit $a$ is electrically connected a stationary contact-point, $g$, which makes contact with $f$ and serves as a stop to the lever E when the latter rises in obedience to the attraction of the magnet C. Contact $e$ is electrically connected with the charging-circuit by means of a suitable flexible connection, as shown. Contact $f$ is also connected by a flexible conductor with the section $a'$ of the charging-circuit. A conductor, F, of low resistance is electrically connected at one end with the section $a^2$ of the charging-circuit, and at its opposite end is provided with a stationary contact-point, $h$, which makes contact with $e$ and serves as a stop to the lever E when the latter falls.

A conductor of fusible metal, H, may be employed for the purpose of opening that part of the circuit which is connected to the charging and discharging circuit by fusion, if the charging or discharging current becomes greatly abnormal in quantity from any cause.

In the drawing, the levers E are shown in the position which they occupy while the generator A is charging the batteries B. The current passes from the generator through the line $a$, contacts $g\ f$, lines $a'$, conductors H, batteries B, lines $a^2$, magnets C, and lines $a^3$ and $a^4$ back to the generator. When the charging-current stops or becomes greatly reduced, the magnets C being no longer able to support or uphold their levers E, the latter drop, separating the contacts $g\ f$ and making contact between $e$ and $h$. Thus the batteries B are disconnected at one end from the charging-line $a$, and the circuit of the generator is completed through other paths—viz., through the line $a$, contacts $e\ h$, conductors F, lines $a^2$, magnets C, lines $a^3$, and line $a^4$. When the charging-current is again started, the magnets C raise the levers E into the position shown, and the charging of the batteries is resumed.

The translating devices D (shown as arranged in multiple arc) and the translating devices I (arranged both in multiple arc and in "series") are operated by the discharge of the batteries B when the charging-current from the generator is not acting. If they are left in circuit while the charging-current is acting, they may be regarded as being operated wholly or in part by the charging-current direct. If they require less than the charging-current, the excess of the latter will pass through the battery, augmenting its charge. If they require more than the charging-current, the latter will be supplemented and reenforced by a discharge from the battery.

Instead of using the low conductor F, the resistance G may be employed and may be made adjustable, if desired. The contact-points $e$, $f$, $g$, and $h$ are preferably made of carbon—such as is used in electric-arc lightning—so that their surfaces may not become impaired by the sparks which may occur between them. Obviously an axial magnet with movable core may be employed instead of the form shown at C.

When the levers E are rising, sparks or arcs must form between the points $e$ and $h$ during the time the levers are moving and until contacts are established between $f$ and $g$. The ultimate distance apart of $e$ and $h$ is so adjusted that the resistance to the passage of current offered by the spark or arc between these points is considerable, or even greater than that offered by the battery B, so that when $f$ and $g$ make contact, the passage of current between $e$ and $h$ ceases. When a resistance, G, is placed in the "short-circuit," the points $e\ h$ may be worked at a less separation and the sparks or arcs between them greatly reduced, owing to the fact that the resistance replaces more or less of that which was in the first instance necessarily in the spark between $e$ and $h$.

From the foregoing description it will be observed that when the current is not acting in the charging-circuit the secondary batteries (one or more) will be "open-circuited" or disconnected from the charging-circuit, and the latter will be "short-circuited" around each battery; also, when the charging-current is established in the charging circuit or line, the short circuit around each battery will be opened and the battery thrown or automatically switched into the charging-circuit. Again, when the charging-current stops, each battery will be automatically switched out of the charging-circuit and the latter short-circuited, as at first. These automatic operations prevent the inverse discharge of the battery or batteries through the charging line or circuit when the charging-current is discontinued, prevent reversal of polarity in the dynamo-machine when such is employed for charging, and leave a closed circuit for the charging-current to re-establish itself in when recharging or continued charging of the batteries is desired.

This case is a division of my original application designated as "Case T," filed June 13, 1882, Serial No. 64,033, and is designated "Division B of Case T."

The invention described and claimed in the original application relates to devices or mechanism for automatically controlling and manipulating the charging-current irrespective of any particular arrangement or association of the batteries with respect to the charging-circuit, and I make no claim to said invention in this case, as in this application the invention relates to a separate and distinct improvement, consisting in the relative arrangement of the batteries, charging-circuit, and an automatic switching mechanism, substantially as hereinbefore described, and hereinafter specified in the claims, and is not restricted to the particular construction and arrangement of parts shown and described for automatically switching or manipulating the charging-current.

The invention herein described and claimed is described, but not specifically claimed, in patents granted in the following foreign countries: England, No. 3,108, July 1, 1882; France, No. 150,318, July 26, 1882; Belgium, No. 58,539B, July 22, 1882; Germany, No. 24,582, July 25, 1882; Italy, No. 14,453, September 30, 1882; Austria, No. 3,604, April 15, 1883; Russia, No. 5,699, August 5, 1882; Spain, No. 3,478, February 1, 1883; Portugal, No. 841, May 2, 1883; Cape of Good Hope, 11/121, December 15, 1882; India, 170/82, May 8, 1883; New South Wales, No. 1,262, June 27, 1883; Victoria, No. 3,344, November 13, 1882; South Australia, No. 318, December 20, 1882.

Having fully described my invention, what I claim as new, and desire to secure by Letters Patent, is—

1. In a multiple-arc system of electrical distribution, the combination, with an electric generator, a main or charging circuit, and a secondary battery included in a multiple-arc branch of the main or charging circuit, of a switch for electrically connecting and disconnecting the secondary battery and charging-circuit, and an electro-magnet for automatically actuating the switch and switching the multiple-arc branch and the secondary battery included therein into the charging-circuit, substantially as set forth.

2. In a multiple-arc system of electrical distribution, the combination, with an electrical generator, a main or charging circuit, and a secondary battery included in a multiple-arc branch of the main or charging circuit, of a switch for electrically connecting and disconnecting the secondary battery and charging-circuit, and an electro-magnet for automatically actuating the switch and switching the multiple-arc branch and secondary battery included therein out of the charging-circuit, substantially as set forth.

3. In a multiple-arc system of electrical distribution, the combination, with an electrical generator, a main or charging circuit, and a secondary battery included in a multiple-arc branch of the main or charging circuit, of a switch constructed and adapted to electrically connect and disconnect the secondary battery and charging-circuit, and an electro-magnet for actuating the switch and automatically switching the multiple-arc branch and secondary battery included therein into and out of the charging-circuit, substantially as set forth.

4. In a multiple-arc system of electrical distribution, the combination, with an electrical generator, a main or charging circuit, and a secondary battery included in a multiple-arc branch of the main or charging circuit, of a switch for electrically connecting and disconnecting the secondary battery and charging-circuit, and an electro-magnet included in the charging-circuit of the battery and adapted to actuate the switch and automatically switch the secondary battery into and out of the charging-circuit while the charging-current is established therein, substantially as set forth.

5. In a multiple-arc system of electrical distribution, the combination, with an electrical generator, a main or charging circuit, and a secondary battery included in a multiple-arc branch of the main or charging circuit, of a switch for electrically connecting and disconnecting the secondary battery and main or charging circuit, and an electro-magnet included in the charging-circuit of the battery and adapted to actuate the switch and automatically switch the secondary battery out of the charging-circuit when the charging-current stops or becomes sufficiently reduced, substantially as set forth.

6. In a multiple-arc system of electrical distribution, the combination, with an electrical generator, a main or charging circuit, and a secondary battery included in a multiple-arc branch of the main or charging circuit, of a switch constructed and adapted to electrically connect and disconnect the secondary battery and charging-circuit, and a circuit around the battery adapted to be opened and closed by said switch, and an electro-magnet constructed and adapted to actuate the switch and automatically switch the secondary battery out of the charging-circuit when the charging-current stops or becomes sufficiently reduced and establish a circuit for the charging-current around the secondary battery, substantially as set forth.

7. In a multiple-arc system of electrical distribution, the combination, with an electrical generator, a main or charging circuit, and a secondary battery included in a multiple-arc branch of the main or charging circuit, of a switch for electrically connecting and disconnecting the secondary battery and charging-circuit, and an electro-magnet included in the charging-circuit of the battery and adapted to actuate the switch and automatically switch the battery and its multiple-arc branch circuit out of the charging-circuit while the charging-current is acting therein, substantially as set forth.

8. In a multiple-arc system of electrical distribution, the combination, with an electrical generator, a main or charging circuit, a secondary battery included in a multiple-arc branch of the main or charging circuit, and translating devices included in the discharging or working circuit of the secondary battery, of a switch and an electro-magnet included in the charging-circuit of the battery and adapted to automatically establish a closed circuit around the battery and its discharging-circuit when the charging-current stops or becomes sufficiently reduced, substantially as set forth.

9. In a multiple-arc system of electrical distribution, the combination, with an electrical generator, a main or charging circuit, and a secondary battery included in a multiple-arc branch of the main or charging circuit, of a resistance in a circuit around the battery, a switch constructed and adapted to electrically connect and disconnect the battery and charging-circuit, and a circuit including a resistance around the battery controlled by said switch, and an electro-magnet constructed and adapted to actuate the switch and automatically switch the battery out of the charging-circuit and automatically establish a circuit including the resistance around the battery, substantially as set forth.

10. In a multiple-arc system of electrical distribution, the combination, with an electrical generator, a main or charging circuit, and two or more secondary batteries, each included in an independent multiple-arc branch of the main or charging circuit, of a switch and electro-magnet associated with each multiple-arc branch and constructed and adapted to automatically and independently switch the secondary batteries included therein into the charging-circuit, substantially as set forth.

11. In a multiple-arc system of electrical distribution, the combination, with an electrical generator, a main or charging circuit, and two or more secondary batteries, each included in an independent multiple-arc branch of the main or charging circuit, of a switch and electro-magnet associated with each multiple-arc branch and constructed and adapted to automatically and independently switch the secondary batteries included therein out of the charging-circuit, substantially as set forth.

12. In a multiple-arc system of electrical distribution, the combination, with an electrical generator, a main or charging circuit, and two or more secondary batteries, each included in an independent multiple-arc branch of the main or charging circuit, of a switch, an electro-magnet included in the charging-circuit of each battery, and a shunt-circuit associated with each battery, said parts being constructed and adapted to automatically and independently switch each of said batteries out of the charging-circuit and establish a circuit around each battery when the charging-current ceases or becomes sufficiently reduced, and to automatically open said circuits around the batteries and switch the latter into the charging-circuit when the charging-current is re-established, substantially as set forth.

In testimony whereof I have signed this specification in the presence of two subscribing witnesses.

CHARLES F. BRUSH.

Witnesses:
  LEVERETT L. LEGGETT,
  ALBERT E. LYNCH.